United States Patent [19]

Kim

[11] Patent Number: 5,342,024
[45] Date of Patent: Aug. 30, 1994

[54] AUTOMATIC FLUSHING DEVICE FOR URINAL

[76] Inventor: Dong J. Kim, 1302-1301, Jugong Apartment, Chelsandong, Kwangmyungshi, Kyunggido, Rep. of Korea

[21] Appl. No.: 37,387

[22] Filed: Mar. 26, 1993

[30] Foreign Application Priority Data

Apr. 9, 1992 [KR] Rep. of Korea ............... 92-6056

[51] Int. Cl.⁵ .................. F16K 31/04; F16K 31/12
[52] U.S. Cl. .................. 251/40; 251/129.12; 4/DIG. 3
[58] Field of Search .............. 4/DIG. 3; 251/35, 38, 251/40, 129.12, 41, 129.13; 137/454.2, 454.6

[56] References Cited

U.S. PATENT DOCUMENTS

| | | | |
|---|---|---|---|
| 1,146,009 | 7/1915 | Mason | 251/35 |
| 1,516,814 | 11/1924 | Flynn | 251/40 |
| 1,965,328 | 7/1934 | Wright | 251/40 |
| 2,406,259 | 8/1946 | Russell et al. | 251/40 |
| 2,552,625 | 5/1951 | Filliung, Jr. | 4/DIG. 3 |
| 2,635,691 | 4/1953 | Filliung | 4/DIG. 3 |
| 2,694,544 | 11/1954 | Hall | 251/38 |
| 2,804,281 | 8/1957 | Osburn | 137/454.2 |
| 4,570,272 | 2/1986 | Kawaguchi et al. | 4/DIG. 3 |
| 4,742,583 | 5/1988 | Yoshida et al. | 4/313 |
| 4,927,114 | 5/1990 | Baker et al. | 137/454.2 |
| 4,941,215 | 7/1990 | Liu | 4/406 |
| 4,957,274 | 9/1990 | Hood et al. | 251/129.12 |
| 5,074,520 | 12/1991 | Lee et al. | 251/40 |

Primary Examiner—Robert M. Fetsuga
Attorney, Agent, or Firm—Robert W. Becker & Associates

[57] ABSTRACT

An automatic flushing device for a urinal has a sensor, a valve assembly for water supply and a control circuit board. The valve assembly comprises a housing having a chamber for receiving a valve, and a chamber for receiving a valve drive. The housing also has an inlet socket and an outlet socket. The valve has a sleeve with an upper portion of a small diameter and a lower portion of a large diameter and an open bottom. The sleeve has inlet port in the upper side wall and a inlet hole in the top portion. A piston is arranged in a reciprocating manner within the upper portion of the sleeve. The piston has an upper piston section provided with a plurality of inlets and a lower piston section provided with an outlet. A relief valve is mounted within the outlet of the piston. A truncated cone spring presses the relief valve down into its closed position. A coil spring installed between the upper piston section and the top portion of the sleeve biases the piston in a downward direction against a bushing. A valve drive comprises a motor, a camshaft having a cam at the front end, a power transmission gear system between the shaft of the motor and the camshaft, a sensor element attached to the rear of the camshaft, and a photo interrupter interacting with the wings of the sensor element and provided with a sensor unit. The actuator pin of the valve is actuated by the cam.

11 Claims, 11 Drawing Sheets

AUTOMATIC FLUSHING DEVICE FOR URINAL

BACKGROUND OF THE INVENTION

1. Field of the Invention

The present invention relates to an automatic flushing device that automatically flushes the urinal in response to a signal from a sensor, and more particularly to an automatic flushing device having a small dry battery as the power source for operation.

2. Description of Related Art

Figure 1:
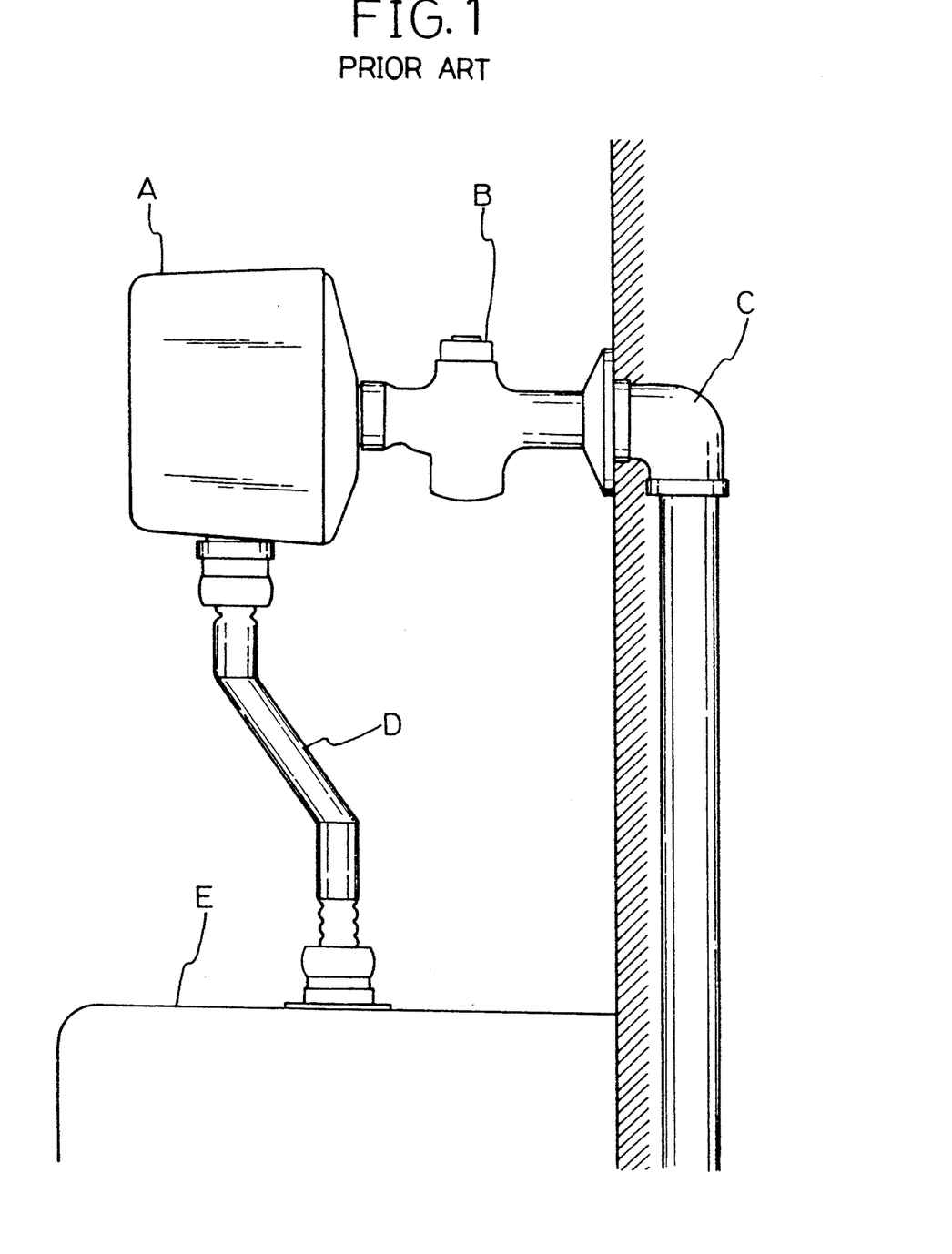
FIG. 1 is a side view showing the installation of an automatic flushing device of the Prior Art.

In general, an automatic flushing device A as shown in FIG. 1 connects through a check valve B with a water supply pipe C on its rear side, its bottom side connecting through a pipe D with a urinal E. The flushing device A includes a valve for allowing or interrupting water flow, a drive means for actuating the valve, a control circuit, and an infrared sensor. However, the conventional flushing devices employ a solenoid unit for actuating opening or closing of the valve, as shown in U.S. Pat. No. 4,742,583 dated May 10, 1988, resulting in large consumption of power.

Therefore, the conventional automatic flushing device employs a transformer to reduce the operating voltage from 110 V or 220 V to e.g. 6 V, 12 V or 24 V to supply low voltage current to the solenoid or employs a large dry battery to supply power to the solenoid. Further, its installation requires a separate wiring for power and additionally a leakage breaker for electrical safety, thus resulting in additional cost for installation by a qualified electrician.

Employing a small dry battery instead of the service power source or the large dry battery results in the problem that the used dry batteries must be replaced frequently with new ones.

Furthermore, the conventional automatic flushing device is in general constructed to have a valve for rapid opening or closing such that shocks (pressure surges) are likely to occur due to a large difference in water pressure during opening or closing operation producing a loud noise resulting from the impact of water. Such pressure surges, if repeatedly occurring, loosens or damage the joints of the water pipe resulting in leakage of water; the damage being more serious in the case of old piping.

Also, whenever the valve opens, strong electric current flows through the solenoid coil and likely causes damage to the coil.

An object of the present invention is to eliminate the above drawbacks of the conventional automatic flushing device for a urinal and provide a novel automatic flushing device that employs a small dry battery for extended operation thereby eliminating the frequent replacement of the battery.

Another object of the invention is to provide an automatic flushing device for a urinal that can be easily installed in a building not having any power lines.

Still another object is to provide an automatic flushing device for the urinal that does not produce any impact phenomenon (pressure surges) by water when opening or closing the valve.

A further object is to provide an automatic flushing device having a drive mechanism reducing the wear of its computers to a minimum for ensuring a long service life.

SUMMARY OF THE INVENTION

The automatic flushing device for a urinal according to the present invention is primarily characterized by:
- a sensor for detecting approaching and departing users;
- a control circuit board for controlling flushing;
- a housing having a first chamber and a second chamber, the first chamber having an inlet socket and an outlet socket connected to the first chamber;
- a valve member positioned in the first chamber and comprising:
  - a sleeve with an upper portion of a first diameter and a lower portion of a second diameter, the first diameter smaller than the second diameter, the sleeve having a top portion and an open bottom, the upper portion having at least two inlet ports and the top portion having a small inlet hole;
  - a piston slidably connected within the upper portion of the sleeve, the piston comprising an upper piston section with a plurality of inlets and a lower piston section having an outlet;
  - a relief valve mounted within the outlet of the piston;
  - a truncated conical spring biasing the relief valve into a closed position within the outlet of the piston;
  - an actuator pin fixedly connected to the relief valve;
  - a coil spring positioned between the upper piston section and the top portion of the sleeve for biasing the piston into a downward direction;
  - a bushing connected within the lower portion of the sleeve and providing an abutment for limiting a downward movement of the piston; and
- a valve drive comprising:
  - a small motor with a drive shaft;
  - a camshaft with a first and a second end with a cam connected to the first end, the actuator pin of the valve actuated by the cam;
  - a gear system connected between the drive shaft of the motor and the camshaft;
  - a sensor element connected to the second end of the camshaft, the sensor element having wings;
  - a photo interrupter with a sensor unit for cooperating with the wings of the sensor element.

Preferably, the outlet of the piston has a truncated cone shape so that the relief valve together with the actuator pin are laterally pivotable in the outlet.

The piston further comprises a pin connected to the upper piston section extending through the inlet hole of the top portion of the sleeve for preventing clogging of the inlet hole.

The first chamber preferably has upper inner wall surfaces with a plurality of ribs and further comprises a washer and a seal ring positioned between the ribs and an abutment of the lower portion of the sleeve. The valve further comprises a valve seat for the relief valve positioned at the lower piston section. Advantageously, the bushing has a piston seat for the piston.

The valve further comprises a V-shaped ring positioned between the piston and the upper portion of the sleeve.

The gear system expediently comprises a first worm gear mounted on the drive shaft of the motor and a second worm gear meshing with the first worm gear and mounted on the camshaft.

The sensor element is preferably butterfly-shaped and the wings are symmetrical to one another and each encompass an arc section of 90 degrees. Between the wings open areas remain that correspond to the shape of the wings.

The control circuit board comprises a control circuit for executing flushing in various flush modes selected from the group consisting of a single flush mode, a double flush mode, a continuous flush mode, and a periodical flush mode. Furthermore, the control circuit board comprises a function select switch for selecting the flush modes.

DETAILED DESCRIPTION OF THE INVENTION

Figure 2:
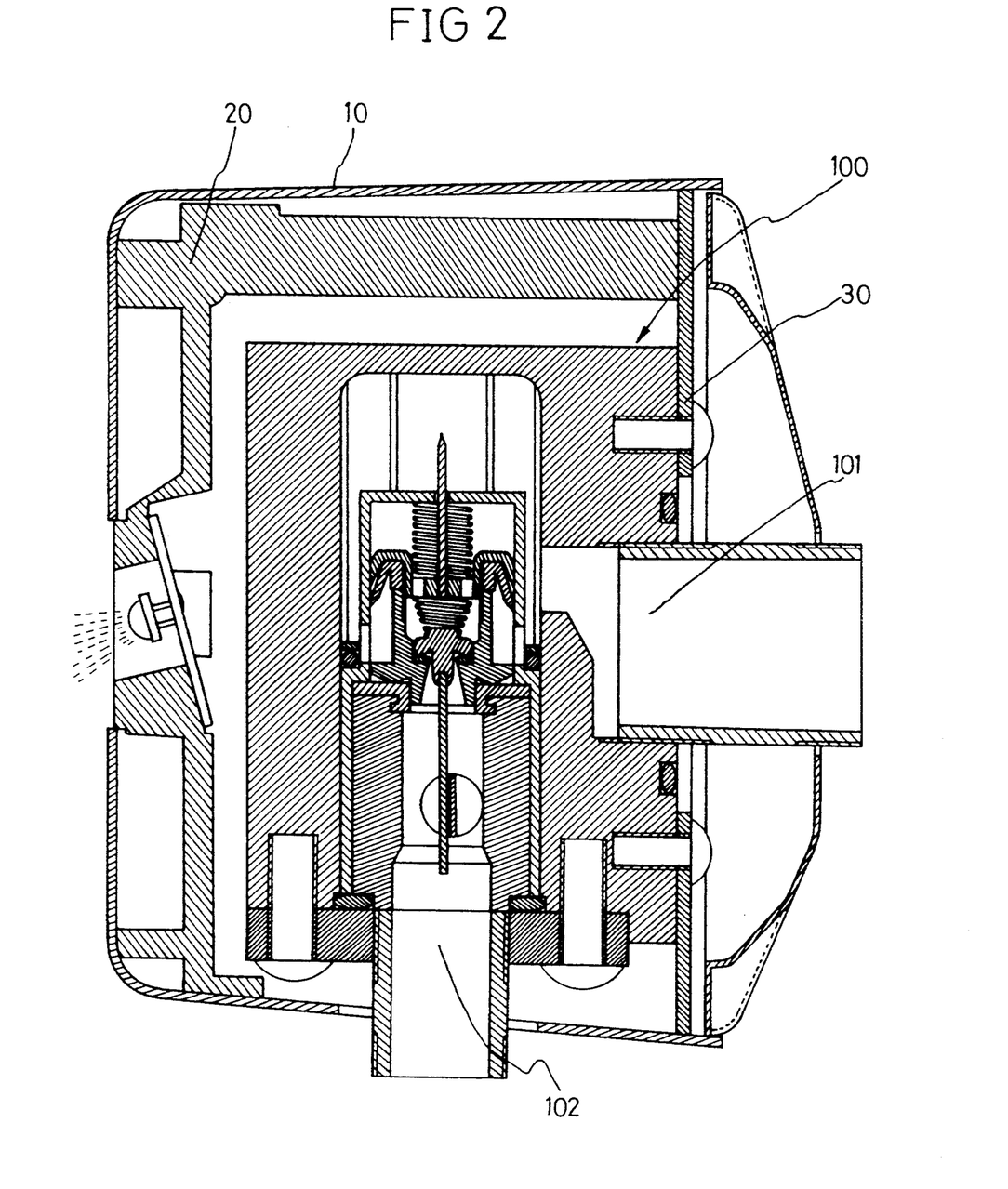
FIG. 2 is a vertical sectional view of an automatic flushing device in accordance with the present invention.
Figure 3:
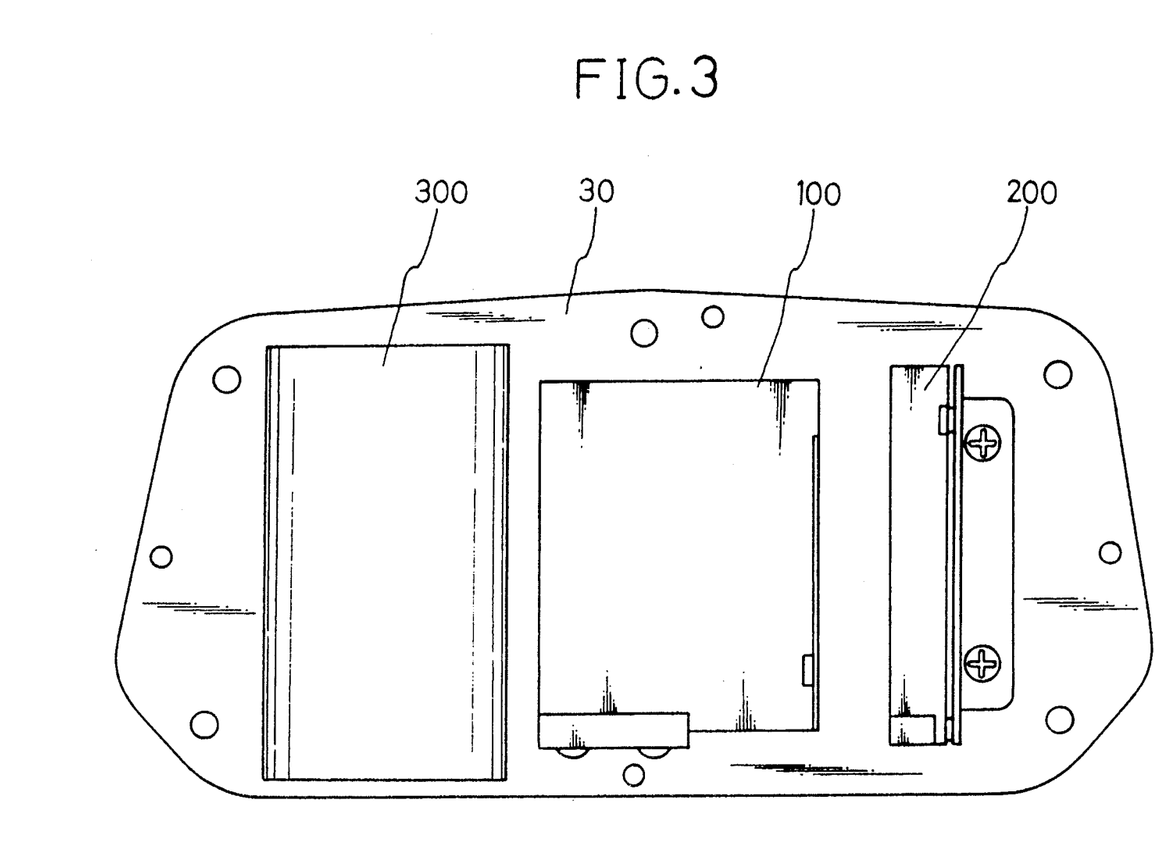
FIG. 3 is a front view of main components installed within the automatic flushing device in accordance with the invention.
Figure 4:
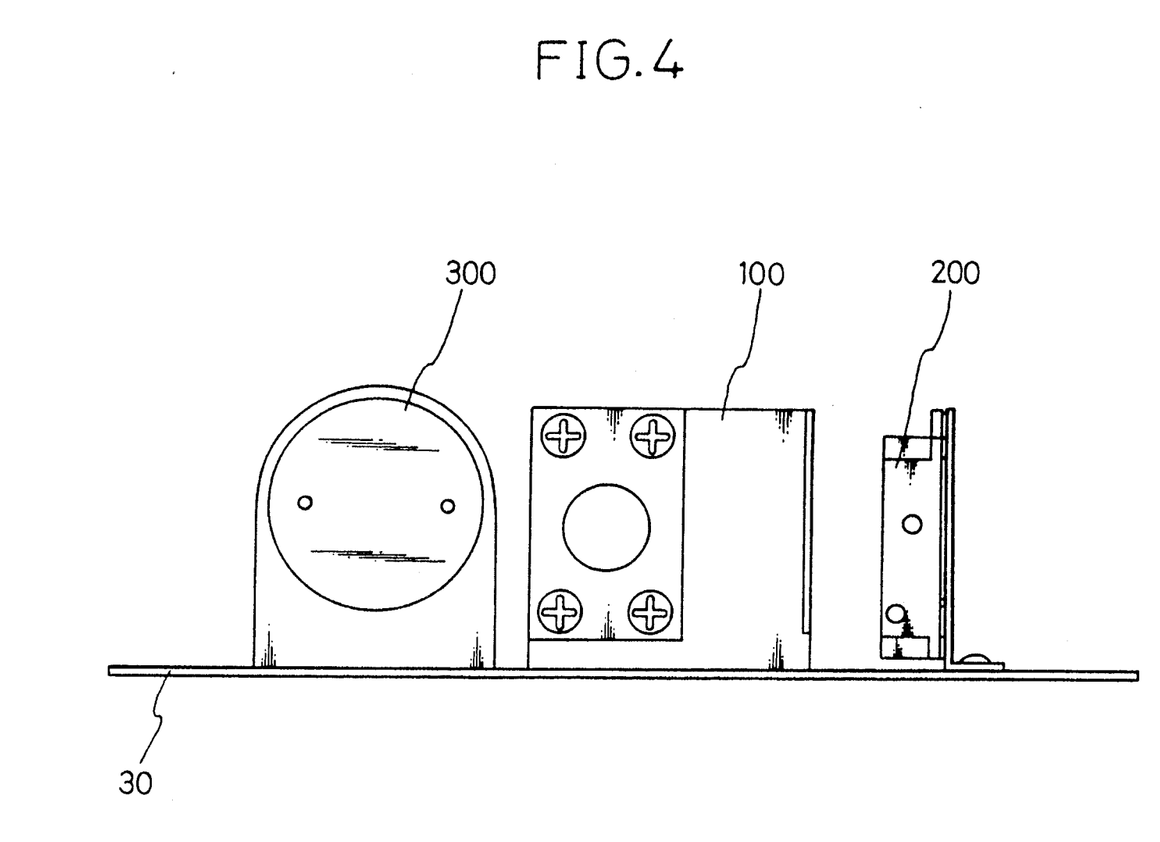
FIG. 4 is a bottom view of the main components.

As shown in FIGS. 2, 3, and 4, the automatic flushing device for the urinal of the present invention comprises a valve assembly 100 for allowing or shutting off water flow, a control circuit board 200 and a battery housing 300 for housing a small dry battery within a main housing 10, in which is also housed a frame 20 and a back plate 30. The valve assembly 100, the control circuit board 200 and the battery housing 300 are fixed to the back plate 30 which is, in turn, fixed to the frame 20.

Figure 5:
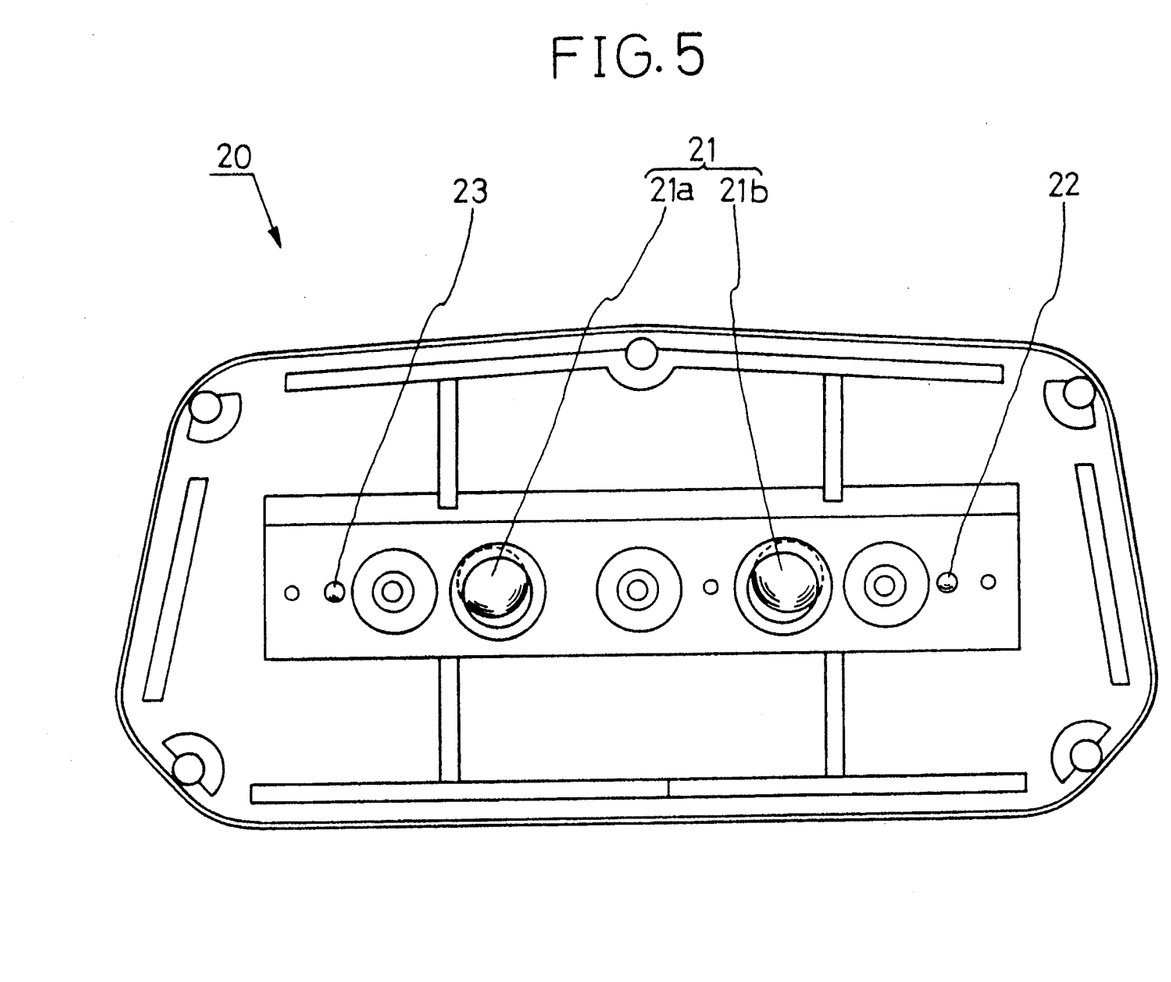
FIG. 5 is a front view of a frame installed within the automatic flushing device in accordance with the invention.

As shown in FIGS. 2 and 5, the frame 20 has mounted to its front two sensors 21 positioned at an angle of 15 degrees to the horizontal, an operation indicator lamp 22 on the right side and a battery low voltage indicator lamp 23 on the left side. The sensor 21 consists of an infrared light emitting element 21a and an infrared light receiving element 21b. The indicator lamp 22 turns on to indicate the opening of valve assembly 100 whereas the battery low voltage indicator lamp 23 turns on when the battery voltage drops under a certain voltage due to the discharge of the battery.

Figure 6:
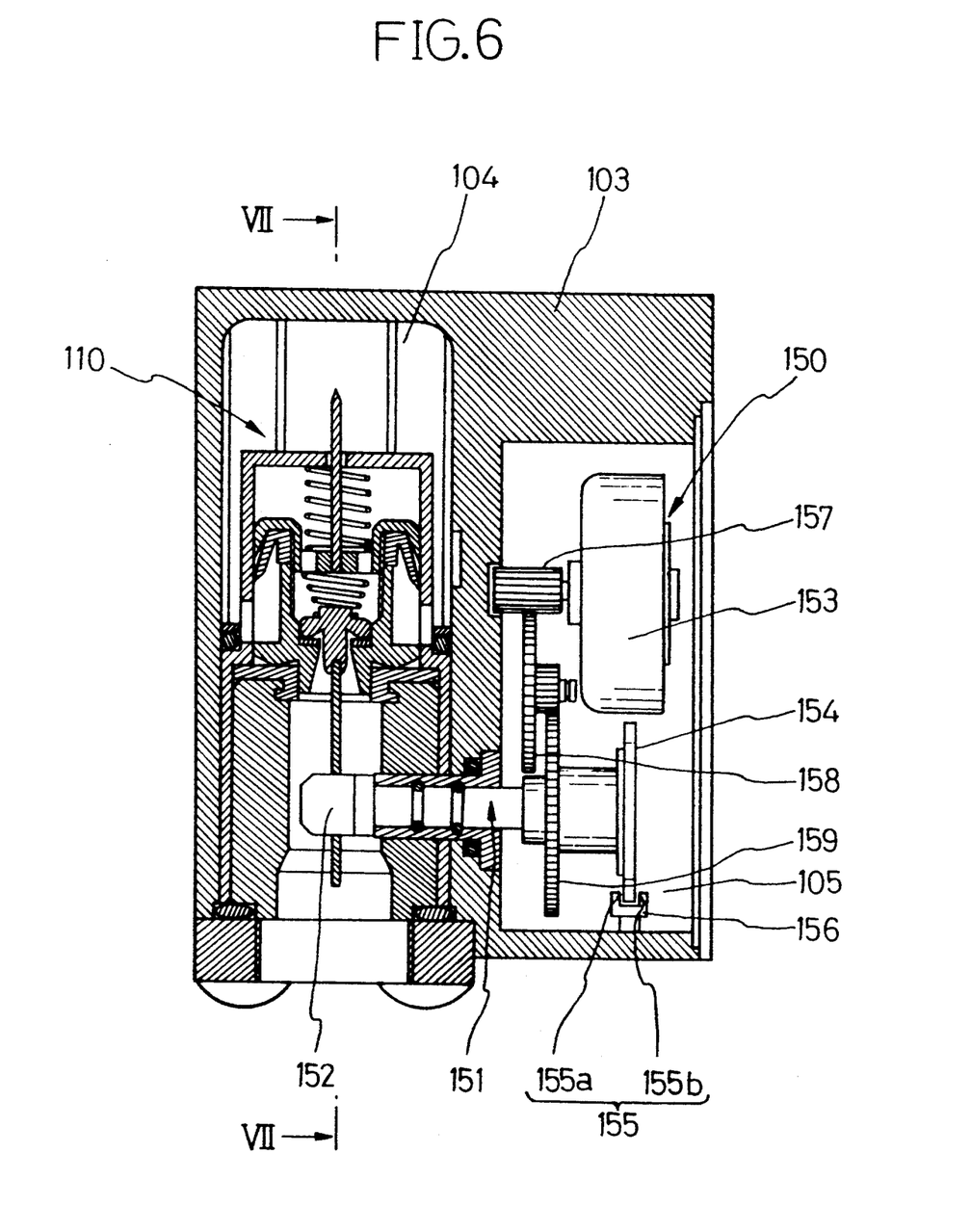
FIG. 6 is a sectional view of the valve assembly in the automatic flushing device in accordance with the invention.

The valve assembly 100 is an essential component comprising a valve assembly housing 103, a valve 110 and a valve drive 150 as shown in FIG. 6.

Figure 7A:
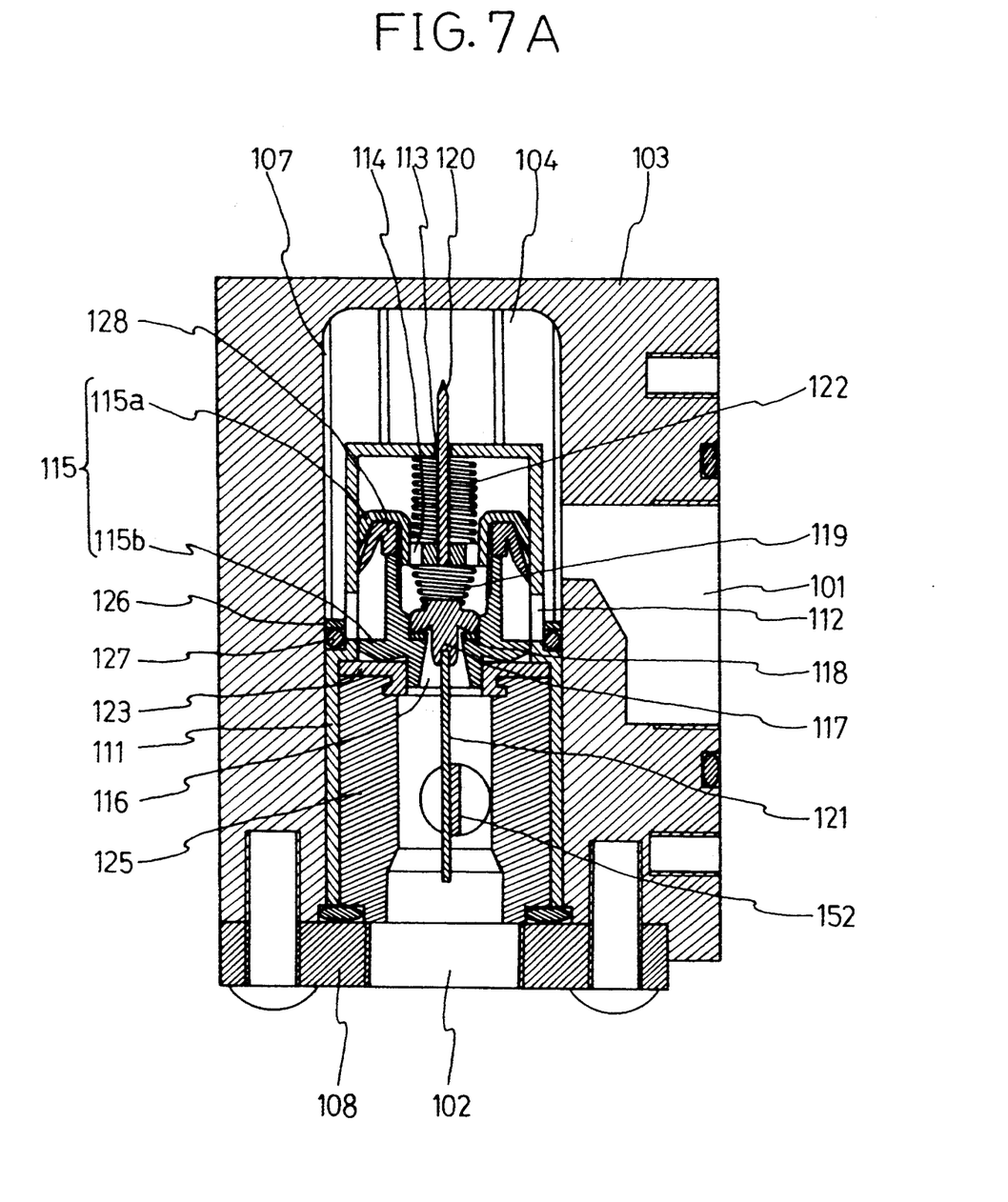
FIG. 7a is a sectional view of the valve assembly along the VII—VII line in FIG. 6, showing the valve in a closed state.
Figure 7B:
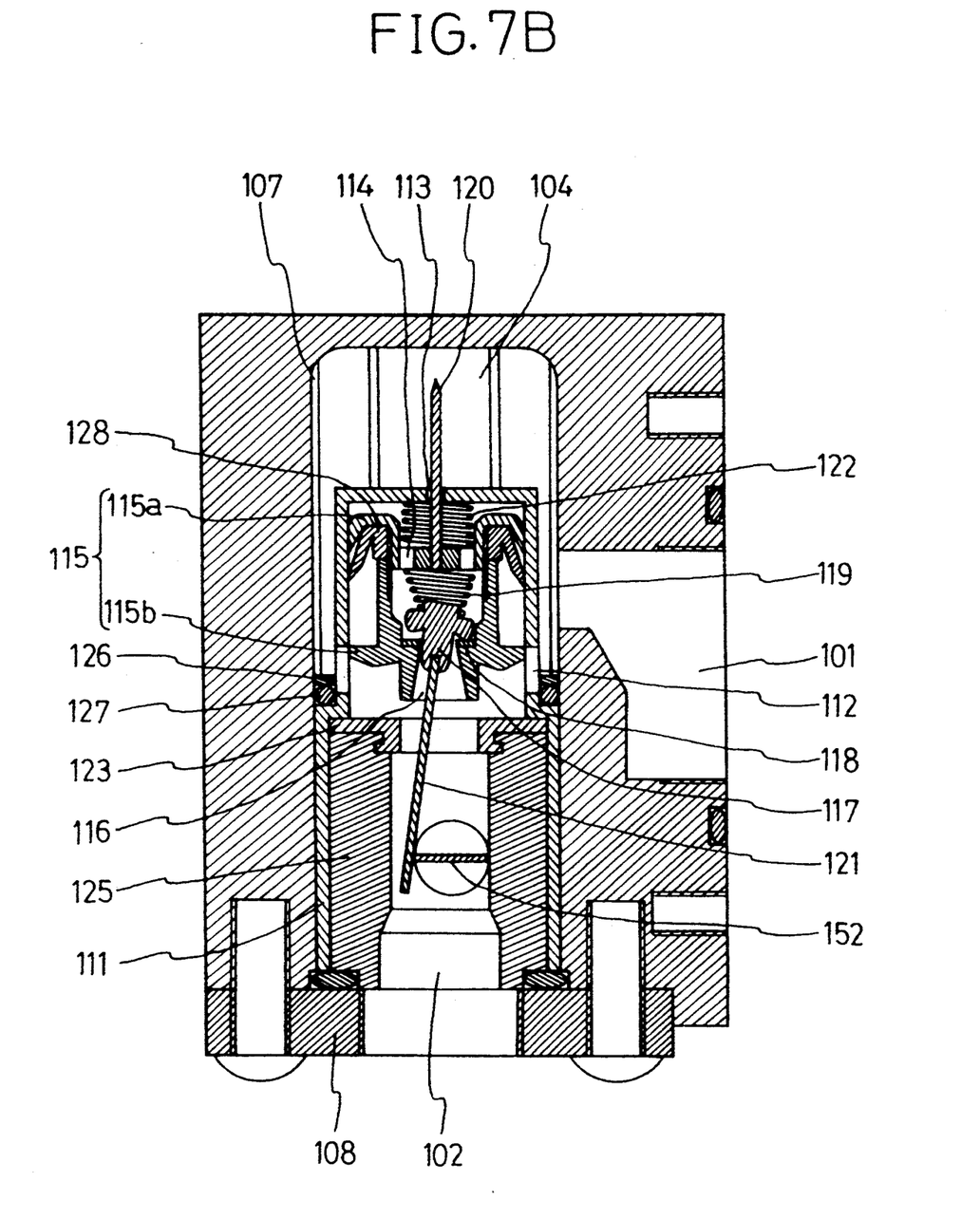
FIG. 7b is a sectional view of the valve assembly showing the valve in an open state.

As shown in FIG. 6 and FIGS. 7a and b, a valve chamber 104 is provided for housing the valve 110 whereas a valve drive chamber 105 is provided for housing a valve drive 150, with an inlet socket 101 and an outlet socket 102 being provided for supplying water and arranged to have respective female threads for receiving pipes. The chamber 104 has a plurality of ribs 107 on the upper inner wall.

As shown in FIGS. 7a and b, the valve 110 comprises a sleeve 111 having an upper portion of a small diameter and a lower portion of a diameter larger than the diameter of the upper portion, an open bottom, a plurality of inlet ports 112 provided at regular intervals in the upper side wall, and a small inlet hole 113 provided in the top portion. A piston 115 reciprocates up and down within the upper portion of the sleeve 111 and has an upper piston section 115a being provided with a plurality of inlets 114 and a lower piston section 115b being provided with an outlet 116, both piston sections being screwed together. A relief valve 117 is placed within the piston 115 and has a part thereof inserted in the outlet 116 of the piston 115. A truncated cone-shaped spring 119 presses down the relief valve 117 into the closed position. A pin 120 preventing the inlet hole 113 from being clogged is fixed to the upper piston section 115a. An actuator pin 121 is fixed to the bottom of the relief valve 117. A coil spring 122 is positioned between the upper piston section 115a and the sleeve top portion to apply a spring force to the piston 115 in the downward direction. A bushing 125 limits the downward movement of the piston 115.

A washer 126 and a seal ring 127 are provided underneath the ribs 107 formed on the upper side wall of the chamber 104. Also, a relief valve seat 118 is provided between the relief valve 117 and the lower piston section 115b, whereas a piston seat 123 is provided between the piston 115 and the bushing 125. The aforesaid components of the valve 110 are all securely housed in the valve chamber 104, with a bottom support 108 having the outlet socket 102.

The inlet hole 113 of a small diameter is provided in the center of the top portion of the sleeve 111 and through it the pin 120 fixed to the upper piston sections 115a moves up and down to prevent the hole from clogging.

To the piston 115 a rubber or silicone ring 128 having a "V" shaped cross-section is mounted to seal a clearance between the piston 115 and the sleeve 111. The outlet 116 of the lower piston section 115b is formed as a truncated cone so that the relief valve 117 and the actuator pin 121 can move to the right and left into an inclined position to open and close the outlet 116.

Now, the valve drive 150 for driving the valve section 110 will be described. As shown in FIG. 6, the valve drive 150 comprises a small motor 153, a cam shaft 151 having a cam 152 at its front end, a gear system for transmitting power from the drive shaft of the motor 153 to the camshaft 151, a sensor element 154 fitted on the rear end of the camshaft 151, and a photo interrupter 156 arranged at the edge region of the sensor element 154 and combined with a sensor unit 155 consisting of a light emitting element 155a and a light receiving element 155b.

Figure 8:
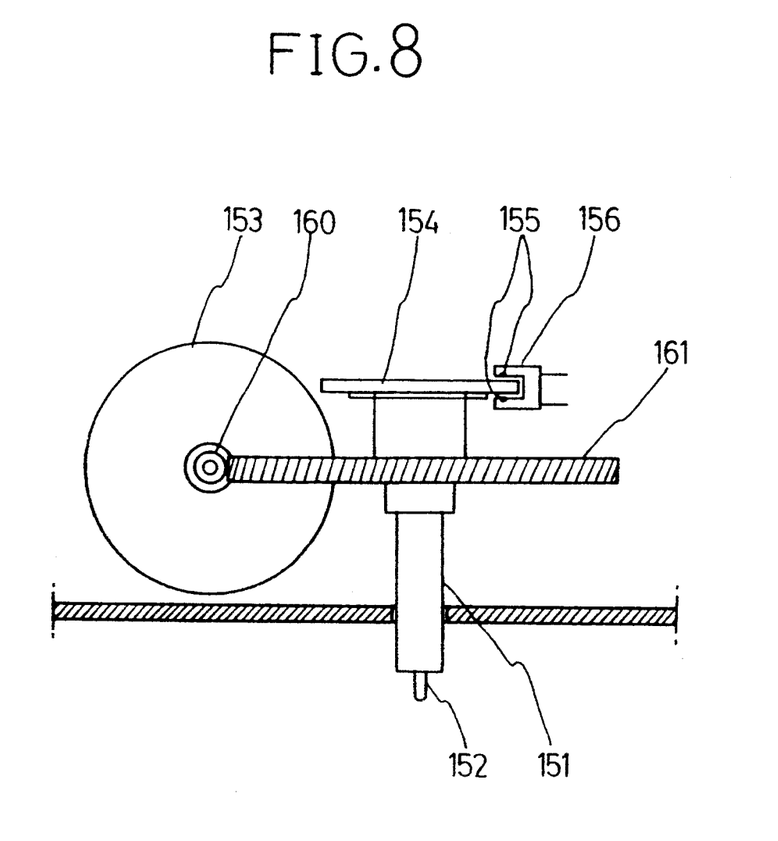
FIG. 8 is a schematic illustration of an embodiment of the valve drive in accordance with the invention.

The gear transmission system may be of various types, but one, for example, as shown in FIG. 6, comprises a motor-driven gear 157, an idle gear 158, and a cam gear 159. The gear transmission system however may employ a first and a second worm gear 160, 161, as shown in FIG. 8. The first worm gear 160 is fitted on the drive shaft whereas the second worm gear 161 is fitted on the camshaft 151. The employment of the worm gear system provides for a simple construction of the power transmission system and with it a large reduction gear ratio is obtainable. Besides, when the small motor 153 stops its operation, the worm gear system is less susceptible to the influence of inertia than the other gear system and instantly stops the rotation of the drive shaft. Furthermore, the power transmission gear system is provided to reduce the rotational speed of the drive shaft in addition to its role of transmitting power.

Figures 9A, 9B:
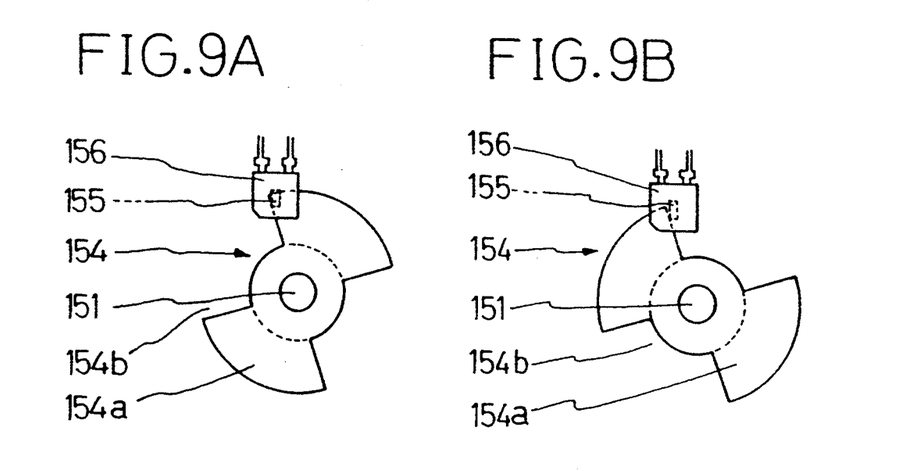
FIG. 9a is a plan view of a sensor element and a photo-interrupter employed for the invention with the valve in a closed state.
FIG. 9b is a plan view of the sensor element and photo-interrupter in FIG. 9a, with the valve in an open state.

As shown in FIGS. 9a and b, the sensor element 154 has a butterfly shape having symmetrical light interrupting wings 154a pl of a fan blade shape with 90 degree arc portions and symmetrical openings 154b of the same 90 degree arc shape as the wings 154a for allowing the free passage of light.

The operation of the valve assembly 100 having the above described construction is as follows.

FIG. 7a illustrates the closed state of the valve, whereas FIG. 7b illustrates the open state of the valve. The cam 152 provided at the front end of the cam shaft 151 of the valve drive 150 is turned 90 degrees, as will be described later herein, to close the valve as shown in FIG. 7a; but in order to open the valve, the cam 152 is turned another 90 degrees to be in the position shown in FIG. 7b.

If the cam shaft 151 of the valve drive 150 is turned 90 degrees from the closed position of the valve, the cam 152 on the shaft 151 actuates the actuator pin 121 and the relief valve 117 into an inclined position, as shown in FIG. 7b, so as to produce a gap between the relief valve 117 and the wall of the outlet 116 of the piston 115. Thus, a small quantity of water entering through the inlet hole 113 in the top portion of the sleeve 111 and the inlets 114 in the upper piston section 115a flows down through the gap between the valve 117 and the wall of the piston outlet 116. The flow of water reduces the water pressure within the inner space of the piston 115 and the space between the upper piston section 115a and the top portion of the sleeve 111 according to Bernouli's Theorem, so that the water pressure above the piston 115 becomes lower than the water pressure at the outer walls of the piston 115, and the pressure difference lifts the piston 115 upward.

The lifting of the piston 115 moves the valve into a position as shown in FIG. 7b, so that water enters in a large amount through the inlet ports 112 into the sleeve 111 and flows below the piston 115 and through the inner path of the bushing 125 toward outlet socket 102 and the drain pipe. The valve is in an open state, in which the piston 115 does not come down because the water pressure above the piston 115 is lower than that at the underside of the piston 115.

To stop the flow of water, the cam 152 of the valve drive 150 is turned by 90 degrees from the open position of the valve, and the truncated cone spring 119 with its restoring force returns the actuator pin 121 and the relief valve 117 to the vertical position, as shown in FIG. 7a, and closes the gap between the relief valve 117 and the wall of the piston outlet 116. The interruption of water flow through the inlet hole 113 and the inlets 114 by closing the gap increases the water pressure within the piston 115 and between the upper piston section 115a and the sleeve top portion to be approximately the same as that of the water flowing below the piston 115, thus lowering the piston 115 due to the spring force of the coil spring 122. Accordingly, the water flow through the inlets 112 stops and the valve section 110 is in a closed position.

According to the automatic flushing device of the present invention, whenever the valve opens or closes, that is, whenever the piston 115 is lifted or lowered, the pin 120 fixed perpendicular to the upper piston subsection 115a moves up and down through the inlet hole 113 of the sleeve 111 to prevent the hole 113 from being clogged by sand, straw or other foreign materials in water.

Further, the actuation time for lifting or lowering the piston 115 depends on the diameter of the inlet hole 113 and the inner diameter of the upper portion of the sleeve. The present invention is designed to provide a relatively long time for the piston displacement to prevent pressure surges resulting from the rapid operation of the valve.

The operation of the valve drive 150 for actuating the pin 121 of the valve 110 will be described in the following.

The sensor 21, comprising a light emitting element 21a and a light receiving element 21b both mounted on the front side of the frame 20, detects a user coming within the detection range and transmits a detection signal to the control circuit of the circuit board 200. The control circuit processes the received signal to supply current to the small motor 153 of the valve drive and to the light emitting element 155a of the sensor unit 155 in the photo interrupter 156.

Accordingly, the motor 153 rotates its drive shaft, and the light emitting element 155a of the sensor 155 emits infrared rays toward the light receiving element 155b. But the infrared light from the element 155a is interrupted by the light interrupting wing 154a of the sensor element 154 so as not to reach the receiving element 155b, as shown in FIG. 9a. However, the activation of the motor 153 turns the camshaft 151 and the sensor element 154 by 90 degrees so that the infrared light interrupted by the wing 154a finally can pass through the open area 154b of the element 154 and reach the light receiving element 155b, as shown in FIG. 9b. The infrared light reaching the element 155b is detected by the control circuit of the circuit board 200 so that the circuit interrupts the current supply to the motor 153 and at the same time momentarily supplies a reverse voltage to the motor for its shaft to instantly stop rotation. Therefore, the camshaft 151 stops rotation at the 90 degree position so that the cam 152 at the front end of the shaft 151 actuates the pin 121 of the valve 110 into an inclined position. The opening operation of the valve 110 by the inclination of the pin 121 has already been described supra.

The time period for maintaining the valve in an open position is adjusted by a time setting circuit 202 of the control circuit.

The elapse of a time period for the open position of the valve signals to the control circuit to again supply current to the motor 153 and the light emitting element 155a of the sensor 155 attached to the photo interrupter 156.

Accordingly, the motor 153 is activated to start the rotation of the cam shaft 151 and the sensor element 154, and the infrared light emitted by the element 155a passes through the open area 154b of the sensor element 154 to reach the receiving element 155b.

A 90 degree turn of the camshaft 151 and the sensor element 154 interrupts the infrared light from the element 155a with the wing 154a. The interruption of the light detected by the control circuit cuts off the current supply to the motor 153 and at the same time momentarily supplies a reverse voltage to the motor to instantly stop the turning of the drive shaft.

The camshaft 151 then stops its rotation at the 90 degree position so that the cam 152 at the front end of the shaft returns to the original position in which the actuator pin 121 is vertical. The closing of the valve by the pin 121 in a vertical position has already been described supra. A control circuit may repeat the above operation even when a user moves away from the detection range of the sensor 21.

As shown in FIG. 10, the mode for flushing can be varied by the control circuit.

Figure 10A:
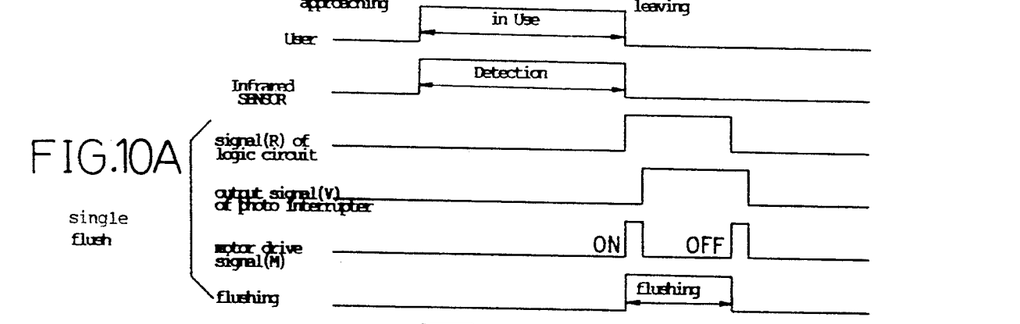
FIGS. 10a–10d is an illustration of various modes to be generally employed for flushing the urinal.

FIG. 10a shows a single flush mode in which the sensor detects a user approaching or leaving the urinal, and the urinal is flushed for a period of time, e.g., 6 to 8 seconds, after the user leaves the urinal.

Figure 10B:
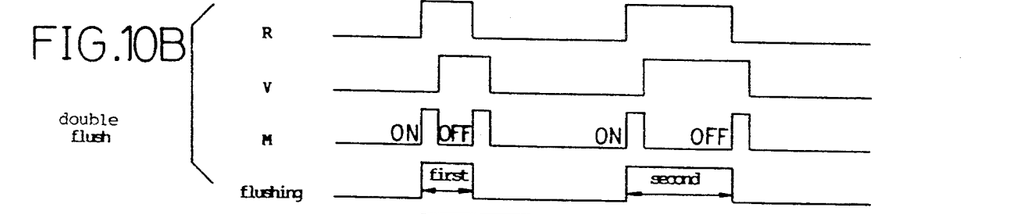

FIG. 10b shows a double flush mode in which an approaching user is detected and a first flush is initiated for a period of, e.g., 3 to 5 seconds. The leaving of the user is detected and a second flush for a period of, e.g., 6 to 8 seconds is performed after the user has left.

Figure 10C:
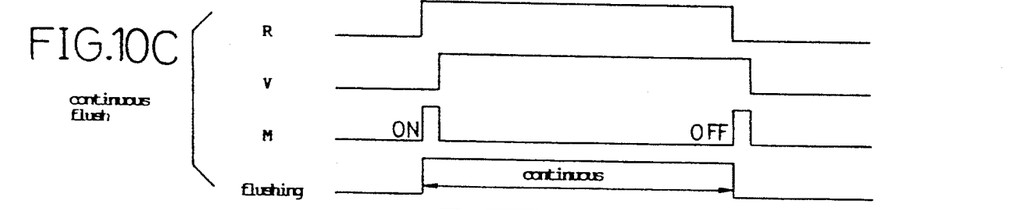

FIG. 10c shows a continuous flush mode in which the urinal is continuously flushed for a period from the moment a user approaches to the moment the user leaves.

Figure 10D:
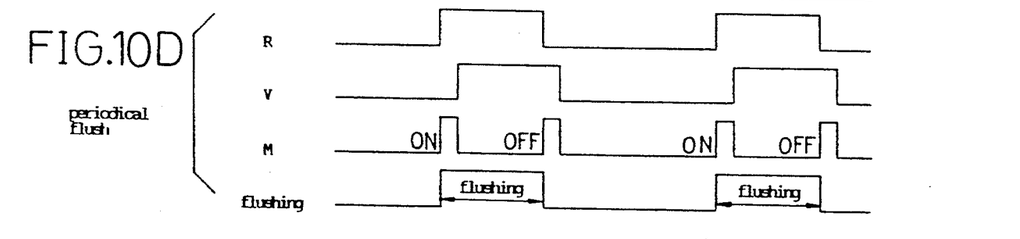

FIG. 10d shows a periodical flush mode in which the urinal is periodically flushed regardless of the presence of a user for, e.g., 6to 8 seconds, for example, every hour.

According to the present invention, a control circuit board 200 is provided with a control circuit that performs the above stated functions, which are selected by a function select switch 201.

Figure 11:
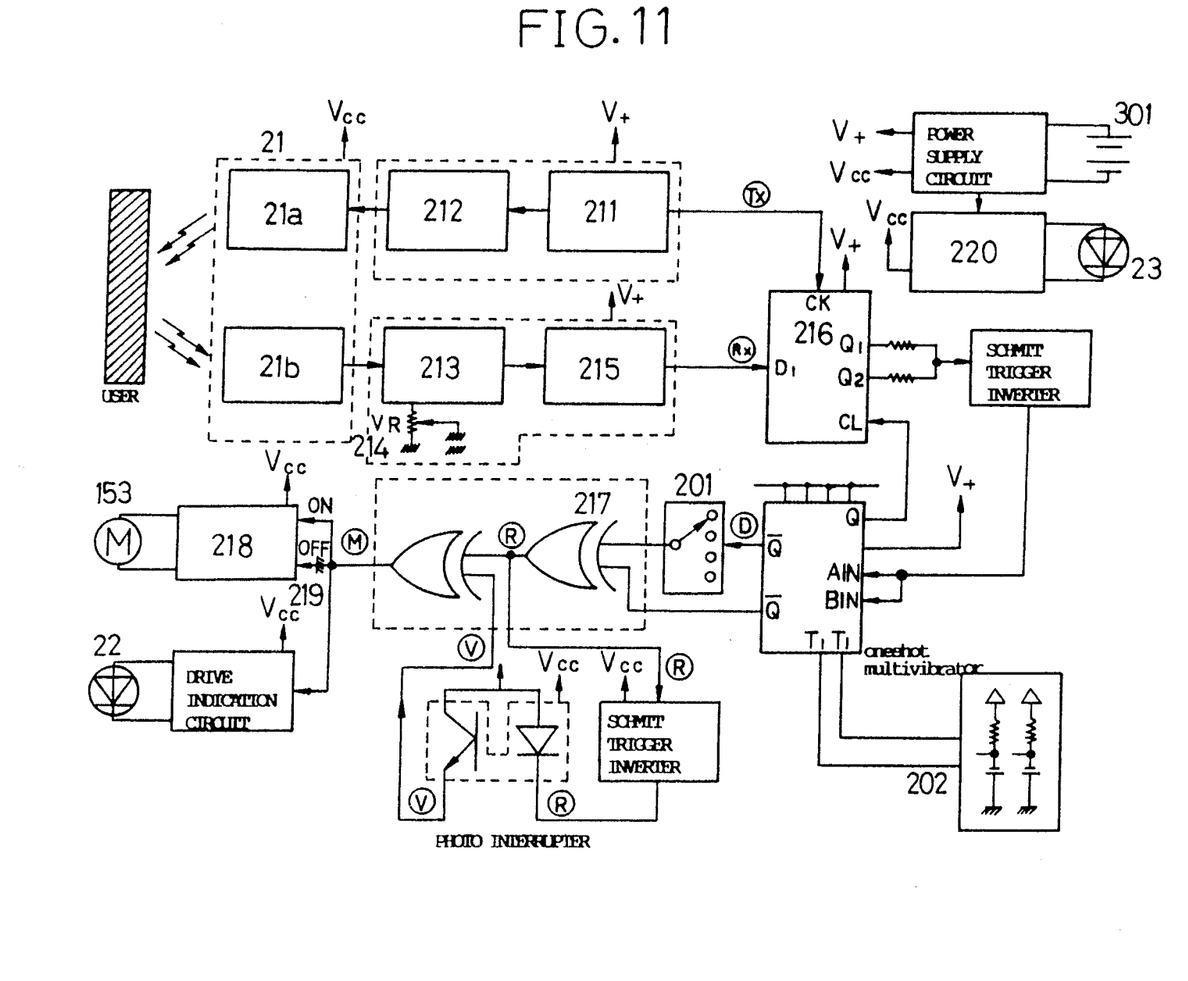
FIG. 11 is a block diagram of a control circuit for performing the function of the automatic flushing device in accordance with the invention.

FIG. 11 shows block diagram of a control circuit for a particular embodiment of the present invention. A frequency oscillation circuit 211 generates a signal transmitted via a Schmit trigger 212 for activating the light emitting element 21a of the sensor 21 to emit infrared light in the form of a pulse signal of a certain frequency.

The infrared light signal from the light emitting element 21a is reflected at a reflector (user) and received by the receiving element 21b where it is amplified by a gain adjusting amplifier circuit 213. The amplification can be adjusted by a variable resistor 214, and the detecting distance of the sensor 21 may also be adjusted following the adjustment of the amplification.

The signal amplified by the circuit 213 is phase-inversed by a phase inversion amplification circuit 215 and at the same time is re-amplified to be supplied as an input signal to a shift register 216. Also, a Tx signal from the frequency oscillation circuit 211 is supplied as input to the clock terminal of the shift resistor 216. The Tx signal and the infrared light signal emitted from the light emitting element 21a have the same frequency.

Only when the input signal Rx responsive to the infrared light signal detected by the receiving element 21b is synchronized with the input signal Tx supplied to the clock terminal, an output signal is released such that any detection by the receiving element 21b of a signal other than the signal from the element 21a is not to influence the flushing operation of the urinal.

The Rx signal continues to vary from "High" to "Low" or from "Low" to "High" in response to the reflecting signal detected by the sensor 21 from the time of a user's arrival within the detection range to the moment of moving out of the range.

With the function select switch 201 one of the modes for a single flush, a double flush, continuous flush or periodic flush is selected, and a time setting circuit 202 sets the time for flushing according to the Rc time constant.

The selection of, for example, a mode for continuous flushing by the function select switch 201 performs the operation of the flushing device as follows. A logic circuit 217 varies the "R" signal from "Low" to "High" or from "High" to "Low", and when the "R" signal is changed from "Low" to "High", a motor drive signal M changes from "Low" to "High" for the motor 153 to execute "ON" operation for opening the valve 110 for supplying water.

When the motor drive signal M is "Low", the interrupter wing 154a of the sensor element 154 interrupts the infrared beam to the photo interrupter 156 and the output signal "V" of the interrupter 156 remains in "Low" state. When the motor drive signal M is "High" for rotating the motor 153, the sensor element 154 turns and its open area 154b is opposite the photo interrupter 156 so that the infrared beam at the photo interrupter 156 is free of interruption and switches the output signal V from "Low" to "High" and the drive signal M from "High" to "Low". Thus, the motor 153 stops to maintain the open state of the valve.

The drop of the motor drive signal M from "High" to "Low" causes a capacitor 219 between a logic circuit 217 and a motor drive circuit 218 to discharge and generate a motor stop signal (OFF or Break Signal), which momentarily supplies reverse voltage to the motor 153 to instantly stop the motor.

On the other hand, at the moment a user moves out of the detection range of the sensor 21, the detection signal disappears and at the same time the "R" signal of the logic circuit 217 changes from "High" to "Low" to vary the motor drive signal M from "Low" to "High" for the signal M to turn on the motor for rotating its drive shaft again in order to close the valve. Also, the rotation of the motor shaft turns the sensor element 154 by 90 degrees so that its wing 154a interrupts the infrared beam at the photo interrupter 156. Then, the output signal V of the photo interrupter 156 drops from "High" to "Low" and the motor drive signal M also drops from "High"0 to "Low" to stop the motor 153 and maintain the closed state of the valve. At the moment the motor drive signal M drops from "High" to "Low", a motor stop signal (OFF) is generated to stop the motor 153 instantly at the correct position.

With the above described operation, one operation cycle for the valve is completed. And the output signal V of the photo interrupter 156 controls the drive of the motor so as not to allow current at the motor while the valve is open or closed.

That is, power is supplied to the motor 153 only at the moment of opening or closing the valve, but no power is supplied to the motor while the valve is in an open or closed state, to thereby greatly reduce power consumption.

The change of the motor drive signal M from "Low" to "High" turns on the drive indication lamp 22 to visually confirm the operation of the motor.

Also, when the voltage of a dry battery 301 in the battery housing 300 drops under a certain level, i.e., under 2.5 V, a battery voltage indication circuit 220 turns on a lamp 23 to indicate the low voltage. The lighting of the lamp 23 indicates the need for a battery replacement.

As described above, the present invention requires a small amount of power to execute the operation of the valve assembly 100 for supplying water. That is, a simple turn of the camshaft 151 by 90 degrees accomplishes the opening or closing of the valve. Furthermore, power is supplied to the motor only at the moment of opening and closing the valve, the time for driving the motor to open or close the valve being a mere 0.2 second. Therefore, the power consumption for operation of the valve is greatly reduced so that only a small dry battery is required, which can last for more than five years.

The present invention thus employs a small dry battery without the inconvenient need of often replacing batteries or using a large dry battery or installing a separate electric service line with required safety measures, such that the installation of the flushing device is easily accomplished for a new or existing building without needing a professional technician and without incurring much additional installation cost.

Another advantage of the present invention is that the actuating components in the valve assembly perform only small movements in slow motion, thus greatly reducing abrasion or wear. Accordingly, the automatic flushing device can be used semipermanently.

Another advantage of the present invention is that when the valve is in operation, the piston 115 moves up and down by pressure difference for slow opening or closing actuation of the valve to thereby prevent the rapid flow or interruption of flow of water causing pressure surges. Thus, not only no pressure surge noise is produced, but also no damage or loosening occurs in the piping from such pressure surges when the inventive valve assembly 100 is being operated.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. An automatic flushing device for a urinal, said flushing device comprising:
a) a sensor for detecting approaching and departing users;
b) a control circuit board for controlling flushing;
c) a housing having a first chamber and a second chamber, said first chamber having an inlet socket and an outlet socket connected to said fist chamber;
d) a valve member positioned in said first chamber and comprising:
ee) a sleeve with an upper portion of a first diameter and a lower portion of a second diameter, said first diameter smaller than said second diameter, said upper portion having a top connected thereto and said lower portion having an inlet ports and said top having a small inlet hole;
ff) a piston slidably connected within said upper portion of said sleeve, said piston comprising an upper piston sections with a plurality of inlets and a lower piston section having an outlet;
gg) a relief valve mounted within said outlet of said piston;
hh) a truncated conical spring biasing said relief valve into a closed position within said outlet of said piston;
ii) an actuator pin fixedly connected to said relief valve;
jj) a coil spring positioned between said upper piston section and said top of said sleeve for biasing said piston into a downward direction;
kk) a bushing connected within said lower portion of said sleeve and providing an abutment for limiting a downward movement of said piston; and
l) a valve drive comprising:
mm) a small motor with a drive shaft;
nn) a camshaft with a first and a second end with a cam connected to said first end, said actuator pin of said valve actuated by said cam;
oo) a gear system connected between said drive shaft of said motor and said camshaft;
pp) a sensor element connected to said second end of said camshaft, said sensor element being butterfly-shaped and having wings, said wings being symmetrical to one another and each encompassing an arc section of 90 degrees, wherein between said wings open areas remain that have the same shape as said wings;
qq) a photo interrupter with a sensor unit for cooperating with said wings of said sensor element.

2. A flushing device according to claim 1, wherein said outlet of said piston has a truncated cone shape so that said relief valve together with said actuator pin are laterally pivotable in said outlet.

3. A flushing device according to claim 1, wherein said piston further comprises a pin connected to said upper piston section extending through said inlet hole of said top of said upper portion of said sleeve for preventing clogging of said inlet hole.

4. A flushing device according to claim 1, wherein:
said first chamber has upper inner wall surfaces with a plurality of ribs and further comprises a washer and a seal ring positioned between said ribs and an abutment of said lower portion of said sleeve;
said valve further comprises a valve seat for said relief valve, said valve seat positioned at said lower piston section; and
wherein said bushing has a piston seat for said piston.

5. A flushing device according to claim 1, wherein said valve further comprises a V-shaped ring positioned between said piston and said upper portion of said sleeve.

6. A flushing device according to claim 1, wherein said gear system comprises a first worm gear mounted on said drive shaft of said motor and a second worm gear meshing with said first worm gear and mounted on said camshaft.

7. A flushing device according to claim 1, wherein said control circuit board comprises a control circuit for executing flushing in various flush modes selected from the group consisting of a single flush mode, a double flush mode, a continuous flush mode, and a periodical flush mode, and further comprises a function select switch for selecting said flush modes.

8. An automatic flushing device for a urinal, said flushing device comprising:
a) a sensor for detecting approaching and departing users;
b) a control circuit board for controlling flushing;
c) a housing having a first chamber and a second chamber, said first chamber having an inlet socket and an outlet socket connected to said fist chamber;
d) a valve member positioned in said first chamber and comprising:
ee) a sleeve with an upper portion of a first diameter and a lower portion of a second diameter, said first diameter smaller than said second diameter, said upper portion having a top connected thereto and said lower portion having an open bottom, said upper portion having at least two inlet ports and said top having a small inlet hole;
ff) a piston slidably connected within said upper portion of said sleeve, said piston comprising an upper piston sections with a plurality of inlets and a lower piston section having an outlet;
gg) a relief valve mounted within said outlet of said piston;
hh) a truncated conical spring biasing said relief valve into a closed position within said outlet of said piston;
ii) an actuator pin fixedly connected to said relief valve;
jj) a coil spring positioned between said upper piston section and said top of said sleeve for biasing said piston into a downward direction;
kk) a bushing connected within said lower portion of said sleeve and providing an abutment for limiting a downward movement of said piston; and
l) a valve drive comprising:
mm) a small motor with a drive shaft;
nn) a camshaft with a first and a second end with a cam connected to said first end, said actuator pin of said valve actuated by said cam;
oo) a gear system connected between said drive shaft of said motor and said camshaft;
pp) a sensor element connected to said second end of said camshaft, said sensor element having wings;
qq) a photo interrupter with a sensor unit for cooperating with said wins of said sensor element; and
r) said piston further comprising a pin connected to said upper piston section extending through said inlet hole of said top of said upper portion of said sleeve for preventing clogging of said inlet hole.

9. A flushing device according to claim 8, wherein said sensor element is butterfly-shaped and said wings a symmetrical to one another and each encompass an arc section of 90 degrees, wherein between said wings open areas remain that have the same shape as said sings.

10. An automatic flushing device for a urinal, said flushing device comprising:
a) a sensor for detecting approaching and departing users;
b) a control circuit board for controlling flushing;
c) a housing having a first chamber and a second chamber, said first chamber having an inlet socket and an outlet socket connected to said fist chamber;
d) a valve member positioned in said first chamber and comprising:
ee) a sleeve with an upper portion of a first diameter and a lower portion of a second diameter, said first diameter smaller than said second diameter, said upper portion having a top connected thereto and said lower portion having an open bottom, said upper portion having at least two inlet ports and said top having a small inlet hole;
ff) a piston slidably connected within said upper portion of said sleeve, said piston comprising an upper piston sections with a plurality of inlets and a lower piston section having an outlet;
gg) a relief valve mounted within said outlet of said piston;
hh) a truncated conical spring biasing said relief valve into a closed position within said outlet of said piston;
ii) an actuator pin fixedly connected to said relief valve;
jj) a coil spring positioned between said upper piston section and said top of said sleeve for biasing said piston into a downward direction;
kk) a bushing connected within said lower portion of said sleeve and providing an abutment for limiting a downward movement of said piston; and
l) a valve drive comprising:
mm) a small motor with a drive shaft;
nn) a camshaft with a first and a second end with a cam connected to said first end, said actuator pin of said valve actuated by said cam;
oo) a gear system connected between said drive shaft of said motor and said camshaft;
pp) a sensor element connected to said second end of said camshaft, said sensor element having wings;
qq) a photo interrupter with a sensor unit for cooperating with said wins of said sensor element; and
r) said first chamber having upper inner wall surfaces with a plurality of ribs and further comprises a washer and a seal ring positioned between said ribs and an abutment of said lower potion of said sleeve;
s) said valve further comprising a valve seat for said relief valve, said valve seat positioned at said lower piston section; and
t) said bushing having a piston seat for said piston.

11. A flushing device according to claim 10, wherein said sensor element is butterfly-shaped and said wings are symmetrical to one another and each encompass an arc section of 90 degrees, wherein between said wings open areas remain that have the same shape as said wings.

* * * * *